USOO6067220A

United States Patent [19]
Ahmann et al.

[11] Patent Number: 6,067,220
[45] Date of Patent: May 23, 2000

[54] SHUNT FOR PROTECTING A HARD FILE HEAD

[75] Inventors: Robert D. Ahmann; William W. Brooks, both of Rochester, Minn.

[73] Assignee: Pemstar, Inc., Rochester, Minn.

[21] Appl. No.: 09/054,090

[22] Filed: Apr. 2, 1998

Related U.S. Application Data

[60] Provisional application No. 60/042,501, Apr. 3, 1997.

[51] Int. Cl.⁷ ....................................................... H02H 3/22
[52] U.S. Cl. .............................. 361/111; 361/56; 361/212; 361/220; 361/127
[58] Field of Search ..................................... 361/212, 220, 361/56, 91, 111, 126–127; 360/113

[56] References Cited

U.S. PATENT DOCUMENTS

| | | |
|---|---|---|
| 4,726,991 | 2/1988 | Hyatt et al. . |
| 4,879,610 | 11/1989 | Jove et al. . |
| 4,977,357 | 12/1990 | Shrier . |
| 5,465,186 | 11/1995 | Bajorek et al. . |
| 5,491,605 | 2/1996 | Hughbanks et al. . |
| 5,539,598 | 7/1996 | Denison et al. . |
| 5,638,237 | 6/1997 | Phipps et al. . |
| 5,644,454 | 7/1997 | Arya et al. . |
| 5,699,212 | 12/1997 | Erpelding et al. . |
| 5,710,682 | 1/1998 | Arya et al. . |
| 5,748,412 | 5/1998 | Murdock et al. . |
| 5,757,590 | 5/1998 | Phipps et al. . |
| 5,757,591 | 5/1998 | Carr et al. . |
| 5,796,570 | 8/1998 | Mekdhanasarn et al. ............... 361/126 |
| 5,805,390 | 9/1998 | Takeura . |
| 5,807,509 | 9/1998 | Shrier et al. . |

*Primary Examiner*—Michael J. Sherry
*Attorney, Agent, or Firm*—Dorsey & Whitney LLP

[57] ABSTRACT

In one embodiment, a variably conductive shunt is provided for protecting a read/write sensor element, e.g., an MR read element, which has first and second terminals. A variably conductive member is electrically connected between the first and second terminals. The variably conductive member conducts charge when a potential sufficient to damage the element is applied across the first and second terminals thereby protecting the element from the charge.

24 Claims, 2 Drawing Sheets

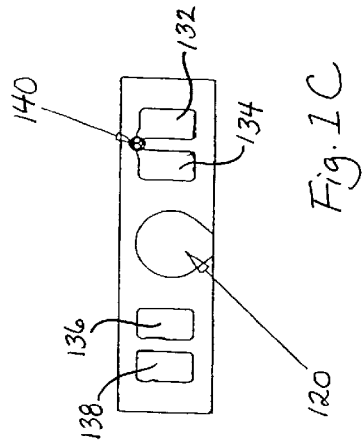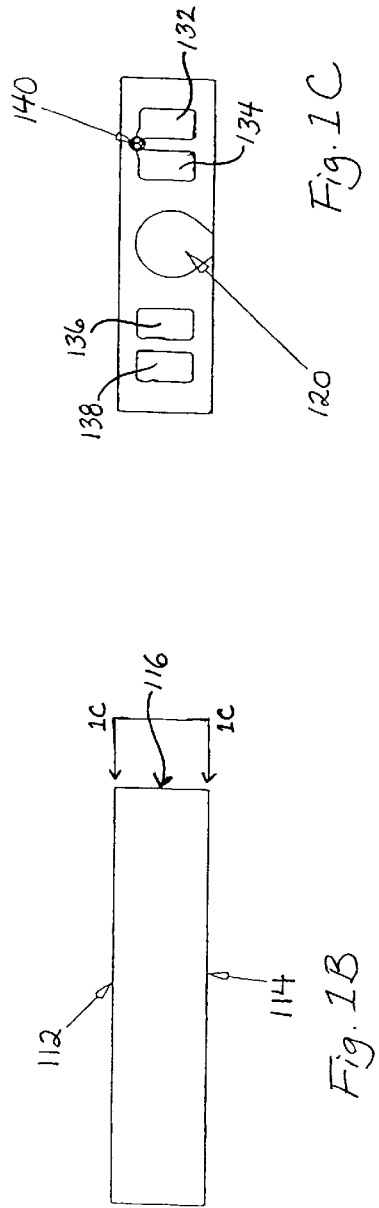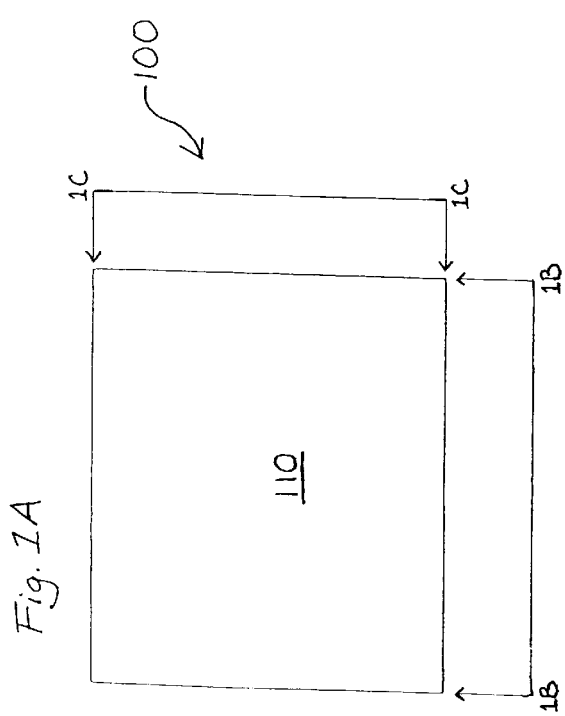

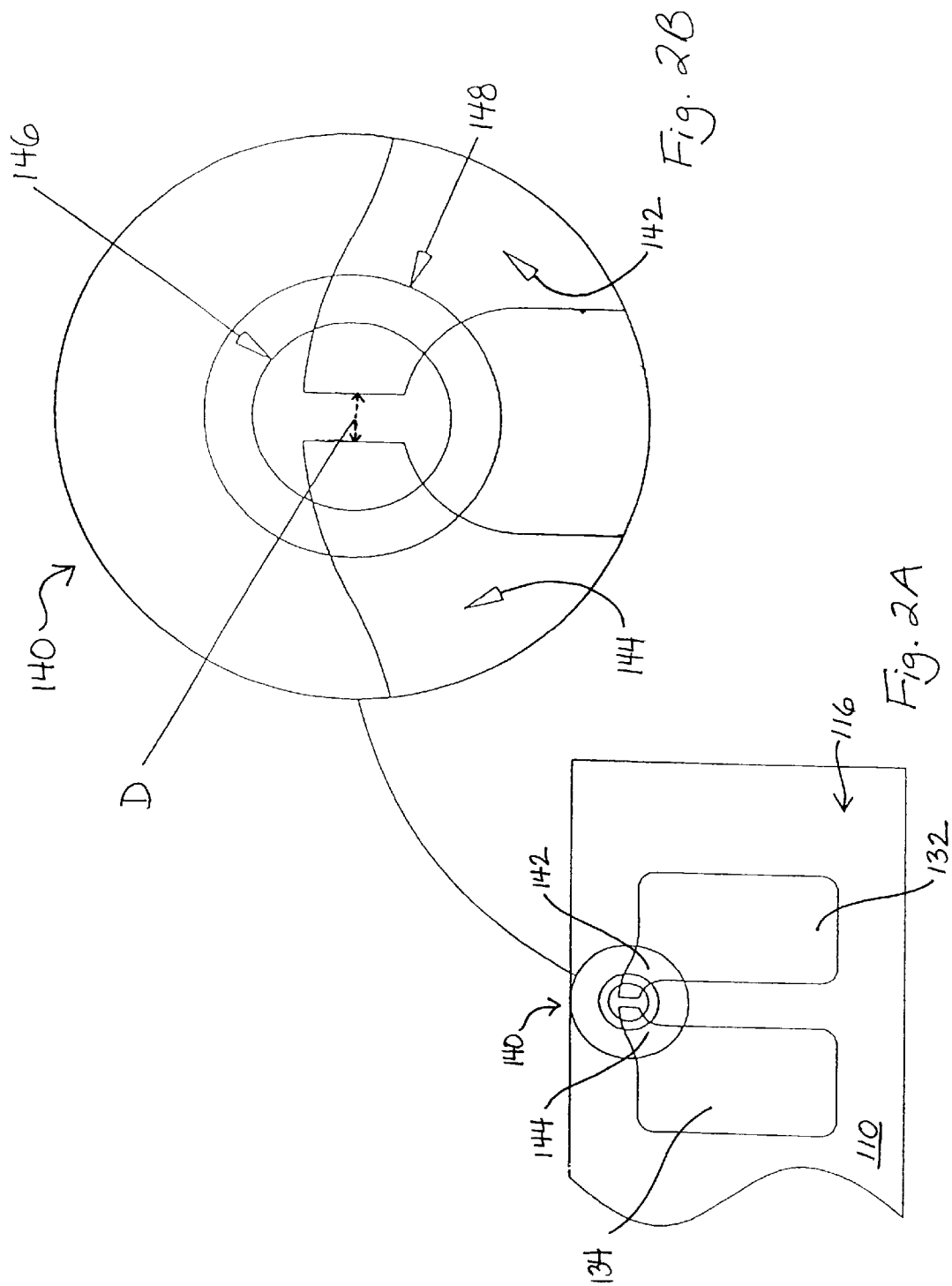

SHUNT FOR PROTECTING A HARD FILE HEAD

This application claims the benefit of and hereby incorporates by reference earlier filed provisional application having Ser. No. 60/042,501, filed on Apr. 3, 1997.

1. TECHNICAL FIELD

The present invention generally relates to a shunt for protecting an element of a read/write sensor. In particular, the present invention relates to a variably conductive polymer shunt for the protection of an element within a read/write sensor.

2. BACKGROUND

A Head Gimbal Assembly ("HGA") is an assembly comprising a slider, a suspension assembly, and some type of wire connections or lead assembly which provides an electrical path to and from the slider. This is also sometimes referred to as a Head Suspension Assembly ("HSA") or as a hard file 'head.' (The 'gimbal' referred to in the name describes the gimballing action which a small part of the suspension, the flexure, provides to the slider.)

A slider can be a rectangular block of some durable material, with some rails or other raised details which creates an air bearing when the slider is moved at high relative velocity over a disk, and with some electromagnetic structure on or near the rear ('down-wind') surface of the slider body which performs the writing and reading of magnetic information to and from the disk. The slider material can be a tough non-magnetic material such as the tungsten carbide used in most, if not all, inductive and magneto-restrictive ("MR") thin film sliders. (The magnetic element is created through the use of a thin film structure hence the name thin film.)

MR is an acronym which stands for magneto-restrictive, an effect exploited to read very faint magnetic records from disks (and tapes). The MR element changes resistance in response to the static magnetic field that it is immersed in. This resistance change can be measured by measuring the voltage change if a constant current source is supplied to the element or by measuring current changes if a constant voltage source is used.

Electro-Static Discharge ("ESD") is the rapid flow of static electricity to an uncharged body. This can be very damaging to fine (i.e. small cross-section) leads in various electronic components, including the MR element of an MR slider. As the storage density goes up, the MR element must be reduced in width and thickness, which makes it increasingly vulnerable to ESD damage. For example, on present MR products, the discharge of the amount of charge that can be carried by the average human body at a potential of 100 volts (VERY low for static charges) is more than enough to destroy the MR element.

The problem is that the very small cross-section magneto-restrictive element in hard file sliders is very susceptible to damaging effects from electrostatic discharge between its terminals (or pads). The MR head is extremely sensitive to ESD. Static potentials of 100 volts or more on a human body are able to totally destroy the MR element, and potentials of 10 volts or more can cause some level of damage called EOS (or electrical over stress) damage to the MR element, damage which can cause recording instabilities.

There are a number of alternative MR head and ESD protection schemes which have been disclosed or patented. One workable scheme involves using solder to bridge a gap between the MR pads on the slider. The solder would be put down at wafer level, and removed at actuator level, so ESD damage would be eliminated for most of the manufacturing process. A laser would be used to melt the solder to open the gap, and this would be done as late as possible in the manufacturing process, possibly just as the actuator is ready to be merged into the file. The drawback to this method is that solder is not a nice material to use in manufacturing, and the laser solder removal process may not ever be 100% reliable.

Other schemes involve connecting the MR leads together somewhere along the head gimbal assembly (HGA), only opening the leads when necessary for testing and for building, e.g., into an actuator. Unfortunately, these schemes all suffer from the drawback that the MR element is only protected for a limited portion of the manufacturing process, not for all of it. Thus, they do not sufficiently decrease the likelihood that an MR head will be damaged by ESD.

Damage from higher voltages is relatively easy to detect through visual inspection of the MR element or a check of the MR element resistance. But EOS damage is significantly harder to detect, sometimes only being detectable after the MR head has been built into a hard file and put through final test, a very expensive place to detect a manufacturing problem. Not only is EOS damage extremely difficult to detect by component level tests but it is also almost impossible to prevent through normal or even extraordinary ESD control measures. By far the best situation would be that all EOS or ESD damage would be prevented at all levels of assembly, and the present invention strives to do that.

3. SUMMARY

In one embodiment, a variably conductive shunt is provided for protecting a read/write sensor element, e.g., an MR read element, which has first and second terminals. A variably conductive member is electrically connected between the first and second terminals. The variably conductive member conducts charge when a potential sufficient to damage the element is applied across the first and second terminals, thereby protecting the element.

4. BRIEF DESCRIPTION OF THE DRAWINGS

FIG. 1A is a top diagrammatic view of a slider of the present invention.

FIG. 1B is a side view of the slider of FIG. 1A taken along line 1B—1B.

FIG. 1C is a side perspective view of the slider of FIG. 1A taken along the line 1C—1C.

FIG. 2A is a top view of a slider with a protective shunt structure of the present invention.

FIG. 2B depicts a magnified view of the protective shunt structure of FIG. 2A.

5. DETAILED DESCRIPTION 5.1 Description of a First Embodiment

FIGS. 1A through 1C show a first embodiment of a slider 100 of the present invention for a hard file head assembly (not shown). Slider 100 includes a slider member 110, a read/write sensor 120, first and second read element pads 132, 134 respectively, first and second write element pads 136, 138 respectively, and a protective shunt structure 140.

Slider member 110 has a suspension bonding surface 112, an air bearing surface 114, and a pad surface 116. The suspension bonding surface 112 is operably connected to the hard file head assembly (not shown), and the air bearing surface 114 faces the disk (not shown) for reading and writing to the hard file. The read/write sensor 120 is formed integrally within slider member 110, as is known in the art. In this embodiment, the read/write sensor 120 includes both a write element and a read element (not shown). For example, the write element may be an inductive element and the read element may be an MR element. In addition, the slider member 110 is formed from a suitable slider material, e.g., a tungsten carbide wafer.

As shown in FIG. 1C, first and second read element pads 132, 134 respectively, are spaced apart from one another and mounted to the pad surface 116 of the slider member 110. Similarly, the first and second write element pads 136, 138 are also spaced apart from one another and mounted to the pad surface 116. The write element of the read/write sensor 120 is electrically connected between the first and second write element pads 136, 138, and the read element of the read/write sensor 120 is electrically connected between the first and second read element pads 132, 134.

With reference to FIGS. 2A and 2B, one embodiment of a protective shunt structure 140 is depicted. The protective shunt structure 140 is also electrically connected between the first and second read element pads 132, 134 in order to protect the read element (not shown). As shown in FIG. 2A, the protective shunt structure 140 is mounted to the pad surface 116 of the slider member 110. Protective shunt structure 140 includes a first pad extension 142, a second pad extension 144, a variably conductive shunt 146, and a protective overlayer 148. The first and second pad extensions 142, 144 each may be unitary extensions of the first and second read element pads 132, 134 respectively, as is depicted in the figures. In one embodiment, the variably conductive shunt 146 is formed from a deposited layer of variably conductive polymer (available from SurgX Corporation of Fremont, Calif.) that is adhered over the first and second pad extensions 142, 144 and the slider member 110. In this manner, the first and second read pads 132, 134 are connected together through the first and second pad extensions 142, 144 with a layer of variably conductive polymer having a controllable, predetermined distance D between the first and second pad extensions 142, 144. (The significance of this distance D will be discussed in greater detail below.) Finally, a protective overlayer (e.g., acrylic overlayer) 148 may be deposited over the variable conductive shunt 146 to protect it from various adverse manufacturing and operational environments.

The variably conductive polymer shunt 146 could be silk-screened onto the correct locations while the slider member 110 is still in a large wafer form, thereby protecting the read, e.g., MR, element from virtually the first time it becomes susceptible to ESD or EOS damage. The protective overlayer (e.g., moisture proof acrylic overcoat) 148 can also be screened on at wafer level to protect the variably conductive material from in-process manufacturing damage. For example, soda blasting may be used to strip photo-resist and this could damage the variably conductive polymer material if it was exposed to the blast.

In operation, the variably conductive shunt 146 conducts charge when an electrical potential sufficient to damage the read element is applied across the first and second read element pads 132, 134. In this manner, the variably conductive shunt 146 protects the read element from ESD and/or EOS damage by diverting the damaging charge around the read element. The variably conductive shunt 146 has a relatively low impedance when a sufficiently high potential (breakdown voltage) is applied across first and second read element pads 132, 134. Conversely, the variably conductive shunt 146 has a relatively high impedance (i.e., high enough not to adversely affect the operation of the read element) when a sufficiently low potential (less than the breakdown voltage) is applied across the first and second read element pads 132, 134.

For low voltages the variably conductive material behaves like a very high megohm resistor and very low capacitor, but for higher voltages the material temporarily breaks down and conducts with very low resistance. This 'tunneling' behavior is akin to that of a solid state diode. The functional effect of this implementation is similar electrically to two diodes placed 'head' to 'head' connecting the two element pads. For low voltages, one or the other of the diodes would act to block the current flow between the pads. However, for a high voltage, the back-biased diode would break down and conduct (and of course the forward biased diode conducts for any voltage) so the charge would be shunted around the element.

The breakdown voltage of the variably conductive shunt 146 corresponds to (1) the gap width D between the first and second pad extensions 142, 144, and (2) the composition of the particular variably conductive polymer material used for the variably conductive shunt 146. The gap width D may be set by masking during the metal deposition process (sputtering) of the first and second read pads 132, 134 and thus the first and second pad extensions 142, 144. Alternatively, it could be controlled more precisely by laser ablation of a connected pad structure. This width definition could be done at wafer level and before the variably conductive shunt 146 and protective overlayer 148 are put down on the slider member (e.g., slider wafer) 110.

5.2 Other Embodiments

It will be seen by those skilled in the art that various changes may be made without departing from the spirit and scope of the invention. For example, in addition to spanning between the two pads, the pads could also be connected via the variably conductive material to a ground pad on the slider. In this manner, electrical charge on either the first or the second pad could flow directly to ground rather than needing to flow to the other pad. In addition, the inductive writing element within the read/write sensor could also have ESD protection added to its first and second write element pads.

Accordingly, the present invention is not limited to what is shown in the drawings and described in the specification but only as indicated in the appended claims.

We claim as follows:

1. A shunt for protecting a magnetic head element having first and second terminals, comprising:

a variably conductive polymer electrically connected between the first and second terminals; and whereby said variably conductive polymer conducts charge when a potential sufficient to damage the magnetic head element is applied across the first and second terminals thereby protecting the magnetic head element.

2. The shunt of claim 1, wherein said first and second terminals comprise first and second spaced apart pads disposed on a slider, wherein said variably conductive polymer is disposed on said slider.

3. The shunt of claim 2, wherein said variably conductive polymer is disposed physically between said first and second spaced apart pads.

4. The shunt of claim 3, wherein said first and second spaced apart pads comprise first and second extenders spaced apart from one another by a predetermined distance, wherein a potential at which the variably conductive polymer begins to conduct charge is proportional to the value of said predetermined distance.

5. The shunt of claim 4, wherein the potential at which the variably conductive polymer begins to conduct charge is less than the potential sufficient to damage the magnetic head element.

6. The shunt of claim 3, wherein said variably conductive polymer is applied in a manner such as silk-screening onto said first and second pads.

7. The shunt of claim 6, wherein said magnetic head element is a magneto restrictive element.

8. The shunt of claim 6, wherein said slider comprises a tungsten carbide/alumina composite material.

9. The shunt of claim 1, wherein said variably conductive polymer is electrically connected to a system ground.

10. A slider for a hard file head assembly, comprising:
    (a) first and second spaced apart pads mounted to a slider member;
    (b) a read/write sensor formed within said slider member for operable engagement with a disk, said sensor having a read element electrically connected between said first and second pads; and
    (c) a variably conductive polymer mounted to said slider member and electrically connected between said first and second pads, whereby said variably conductive polymer serves as a conductor when a sufficiently high potential is across said first and second pads.

11. The slider of claim 10, wherein said variably conductive polymer is physically disposed between said first and second pads.

12. The slider of claim 11, wherein said read element is a magneto restrictive element.

13. The slider of claim 12, wherein said first and second spaced apart pads comprise first and second extenders spaced part from one another by a predetermined distance, wherein the magnitude of said sufficiently high potential corresponds to the value of said predetermined distance.

14. The slider of claim 13, further comprising a protective layer disposed above said variably conductive polymer.

15. The slider of claim 10, wherein said variably conductive polymer is electrically connected to a system ground.

16. A slider for a hard file head assembly, comprising:
    (a) first and second spaced apart pads mounted to a slider member;
    (b) a read/write sensor integral to said slider member for operable engagement with a disk, said sensor having a read element electrically connected between said first and second pads; and
    (c) a first variably conductive polymer mounted to said slider member and electrically connected between said first pad and a system ground, whereby said first variably conductive polymer serves as a conductor when a sufficiently high potential is across said first pad and said system ground.

17. The slider of claim 16, further comprising a second variably conductive polymer mounted to said slider member and electrically connected between said second pad and said system ground.

18. A shunt for protecting a read element having first and second terminals, comprising:
    a variably conductive polymer electrically connected between the first and second terminals; and
    whereby said variably conductive polymer has a relatively low impedance when a sufficiently high potential is applied across said first and second terminals, and said variably conductive polymer has a relatively high impedance when a sufficiently low potential is applied across said first and second terminals.

19. A method of protecting a head gimbal assembly having first and second terminals, comprising:
    operably connecting a variably conductive polymer to the first and second terminals, whereby the variably conductive polymer prevents a potentially damaging potential from developing between the first and second terminals.

20. The method of claim 19, wherein said variably conductive polymer is physically disposed between said first and second terminals.

21. The method of claim 19, wherein the step of operably connecting the variably conductive polymer to the first and second terminals comprises the step of:
    applying the variably conductive polymer onto the first and second terminals in a manner such as silk-screening.

22. The method of claim 19, further comprising:
    operably connecting the variably conductive polymer to a system ground.

23. The method of claim 19, wherein the variably conductive polymer has a relatively high impedance when a sufficiently low potential exists between the first and second terminals and wherein the variably conductive polymer has a relatively low impedance when a sufficiently high potential exists between the first and second terminals.

24. The method of claim 19, wherein the variably conductive polymer conducts charge between the first and second terminals when a sufficiently high potential exists between the first and second terminals.

* * * * *